US009340247B2

(12) United States Patent
Vigeant et al.

(10) Patent No.: US 9,340,247 B2
(45) Date of Patent: *May 17, 2016

(54) CONNECTION SYSTEM FOR PANNIER AND METHOD (71) Applicant: ARKEL OVERDESIGNS, Sherbrooke (CA)

(72) Inventors: Serge Vigeant, Berkeley, CA (US); Paul McKenzie, Sainte-Catherine-de-Hatley (CA)

(73) Assignee: ARKEL OVERDESIGNS, Sherbrooke, Quebec (CA)

( * ) Notice: Subject to any disclaimer, the term of this patent is extended or adjusted under 35 U.S.C. 154(b) by 21 days.

This patent is subject to a terminal disclaimer.

(21) Appl. No.: 14/484,931

(22) Filed: Sep. 12, 2014

(65) Prior Publication Data
US 2015/0001268 A1    Jan. 1, 2015

Related U.S. Application Data (63) Continuation of application No. 12/376,028, filed as application No. PCT/CA2007/001364 on Aug. 3, 2007, now Pat. No. 8,857,685.

(60) Provisional application No. 60/821,409, filed on Aug. 4, 2006.

(51) Int. Cl.
*B62J 9/00* (2006.01)
*B62J 7/08* (2006.01)

(52) U.S. Cl.
CPC ..... *B62J 7/08* (2013.01); *B62J 9/00* (2013.01)

(58) Field of Classification Search
CPC ................................. B62J 9/00; B62J 7/08
USPC ......... 224/419, 423, 431, 447–449, 413, 417, 224/425, 430, 438, 458, 459
See application file for complete search history.

(56) References Cited

U.S. PATENT DOCUMENTS 3,937,374 A    2/1976   Hine, Jr.
4,084,299 A    4/1978   Noda
(Continued)

FOREIGN PATENT DOCUMENTS

CA    2137836         12/1993
DE    19531836 A1     3/1997
(Continued)

OTHER PUBLICATIONS

Translation of DE 100,14,291 A1.*
(Continued)

Primary Examiner — Corey Skurdal
(74) Attorney, Agent, or Firm — Norton Rose Fulbright Canada LLP (57) ABSTRACT A pannier comprises a container portion and a connection system. Two connectors each have a portion rotatable between an opened position to allow the connectors to be installed onto the rod-like member, and a locking position in which the portions lock the connectors to the rod-like member, and a biasing member biasing the portions toward the locking position. The portions of the connectors each rotate about an axis transverse with respect to the rod-like member. The portions of the connectors are oriented so as to rotate in opposite directions with respect to one another when concurrently rotating to the opened position and concurrently rotating to the locking position. A strap connected to said portions of both of the connectors, the strap being positioned with respect to the container portion in a grasping position such that a pulling action on the strap concurrently rotates said portions to the opened position.

11 Claims, 10 Drawing Sheets (56) References Cited

U.S. PATENT DOCUMENTS

| | | | |
|---|---|---|---|
| 4,262,829 | A | 4/1981 | Hine, Jr. et al. |
| D361,548 | S | 8/1995 | Bascom |
| 5,505,352 | A | 4/1996 | Sisson et al. |
| 5,673,833 | A | 10/1997 | Ortlieb |

FOREIGN PATENT DOCUMENTS

| | | |
|---|---|---|
| DE | 29802422 U1 | 5/1998 |
| DE | 29819331 U1 | 1/1999 |
| DE | 10014291 A1 | 9/2001 |

OTHER PUBLICATIONS

Cam-Lock attachment system video [on line]. 1st archived publication date: Jun. 4, 2006 [retrieved on Sep. 27, 2007] Retrieved from Internet search engine www.archive.org: <URL:http://web.archive.org/web/20060718203846/www.arkel-od.com/technical/suspension.asp?fl=1&site=>.

International Search Report, PCT/CA2007/001364, Nov. 20, 2007.

* cited by examiner

CONNECTION SYSTEM FOR PANNIER AND METHOD

CROSS-REFERENCE TO RELATED APPLICATION

The present patent application is a continuation of U.S. patent application Ser. No. 12/376,028 filed Feb. 2, 2009 which is a 371 of international application No. PCT/CA07/01364 filed on Aug. 3, 2007 which claims priority on U.S. Provisional Patent Application No. 60/821,409, filed on Aug. 4, 2006.

FIELD OF THE APPLICATION

The present application generally relates to a connection system for securing bags to frames or racks of bicycles, motorcycles and like vehicles.

BACKGROUND OF THE ART

The ever-increasing popularity of touring on two-wheel vehicles and live vehicles, such as bicycles and motorcycles, and the use of such vehicles for urban transportation means, has caused an advance in the equipment used to carry luggage and items. For instance, in the bicycling industry, panniers, also called bike bags, are typically secured to different portions of the bike or to racks added to the bikes.

U.S. Pat. No. 5,673,833, issued on Oct. 7, 1997 to Ortlieb, discloses a device for holding bags in which fastening clips close around a rod of carrier racks, handle-bars or struts of bicycles (hereinafter rod). The clips enclose the rod. A spring is provided to force the clips into the locking position.

Considering that the fastening clips enclose and accommodate the rod, the device of Ortlieb requires shims that will shape the fastening clips to the geometry of the rod. As there are various dimensions of rods for frames, the device of Ortlieb must provide various shim dimensions to ensure that the device will be suitably connected to the rods of the frame so as to limit rattling resulting from play between the clips and the rods.

SUMMARY OF THE APPLICATION

It is an object of the present invention to provide a connection system for panniers that addresses issues associated with the prior art.

Therefore, in accordance with a first embodiment, there is provided a pannier comprising: a container portion adapted to accommodate items; a connection system connected to the container portion and comprising two connectors for connection to a rod-like member, each of the at least two connectors having a portion rotatable between an opened position to allow the connectors to be installed onto the rod-like member, and a locking position in which the portions lock the connectors to the rod-like member, and a biasing member biasing the portions toward the locking position, wherein: said portions of the connectors each rotate about an axis transverse with respect to the rod-like member; and said portions of the connectors are oriented so as to rotate in opposite directions with respect to one another when concurrently rotating to the opened position and concurrently rotating to the locking position; a strap connected to said portions of both of the connectors, the strap being positioned with respect to the container portion in a grasping position such that a pulling action on the strap concurrently rotates said portions to the opened position.

Further in accordance with the first embodiment, the cam portion of the at least one connector rotates about an axis substantially transverse with respect to the rod-like member.

Still further in accordance with the first embodiment, the connection system has two of the connectors.

Still further in accordance with the first embodiment, the cam portions of the two connectors are oriented so as to rotate in opposite directions when concurrently rotating to the opened position and to the locking position.

Still further in accordance with the first embodiment, a carrying strap interrelates the two cam portions, such that a pull on the carrying strap displaces the cam portions away from their locking position toward their opened position.

Still further in accordance with the first embodiment, the connection system has a track, the two connectors being slidingly mounted to the track such that a position of the two connectors on the track is adjustable as a function of a shape of the rod-like member.

Still further in accordance with the first embodiment, each of the connectors has a locking mechanism to lock the connectors on the track in selected positions.

Still further in accordance with the first embodiment, a line between said axis and a contact point between the cam portion and the rod-like member is not perpendicular to the rod-like member when the cam portion is in the locking position.

Still further in accordance with the first embodiment, the cam portion has a concave surface accommodating a portion of the rod-like member when the cam portion is in the locking position.

Still further in accordance with the first embodiment, the cam portion has a shim in said concave surface to press against the rod-like member, the shim being made of a material having a greater friction coefficient than a remainder of the cam portion.

Still further in accordance with the first embodiment, an abutment insert in the hook portion defines a contact surface for the hook portion against the rod-like member.

Still further in accordance with the first embodiment, the cam portion presses solely against the rod-like member to lock the rod-like member in the hook portion.

In accordance with a second embodiment, a method for installing a pannier to a rod-like member, comprising: providing a pannier with a pair of connectors actuatable by a carrying strap; lifting the carrying strap with respect to a remainder of the pannier so as to simultaneously open the connectors; hooking the opened connectors onto the rod-like member; and releasing the strap whereby the connectors press solely against the rod-like member.

Further in accordance with the second embodiment, the method comprises adjusting a position of the pair of connectors on the pannier prior to installing the pannier on the rod-like member.

Still further in accordance with the second embodiment, the method comprises adding abutment inserts in the connectors prior to installing the pannier on the rod-like member.

Still further in accordance with the second embodiment, the method comprises providing a biased hook on a bottom end of the pannier, and further comprises connecting the biased hook to a structure associated with the rod-like member.

In accordance with a third embodiment, there is provided a pannier comprising: a container portion adapted to accommodate items; a connection system comprising at least two connectors each comprising a hook portion adapted to hook onto the rod-like member, a cam portion positioned with respect to the hook portion and being displaceable between an opened position to allow the rod-like member to reach the hook portion, and a locking position in which the cam portion is adapted to press against the rod-like member to lock the rod-like member in the hook portion, and a biasing member biasing the cam portion to the locking position; a carrying strap connected to the cam portion of both of the connectors, the carrying strap being positioned with respect to the container portion in a grasping position such that a pulling action on the carrying strap displaces the cam portions to the opened position; and a retaining strap connected to at least one of the connection system and the container portion, and arranged so as to maintain the carrying strap in the grasping position.

Further in accordance with the third embodiment, the connection system has a track between the container portion and the at least two connectors, the two connectors being slidingly mounted to the track such that a position of the two connectors on the track is adjustable as a function of a shape of the rod-like member.

Still further in accordance with the third embodiment, the track is secured to the container portion by a pair of fasteners at opposed ends of the track, with the retaining strap being connected at opposed ends to the fasteners between the track and the container portion.

Still further in accordance with the third embodiment, the fasteners are positioned with respect to the track so as to limit the translation of the connectors along the track.

Still further in accordance with the third embodiment, the cam portion of the at least two connectors rotate each about an axis substantially transverse with respect to the rod-like member.

Still further in accordance with the third embodiment, the cam portions of the two connectors are oriented so as to rotate in opposite directions when concurrently rotating to the opened position by the pulling action on the carrying strap.

Still further in accordance with the third embodiment, a grasping tube is provided on the carrying strap.

Still further in accordance with the third embodiment, an elastic is connected at opposed ends to the connection system, and a hook is on the elastic, the hook being connected to a structure associated with the rod-like member to stabilize the pannier on the structure.

DESCRIPTION OF PREFERRED EMBODIMENTS

Figure 1:
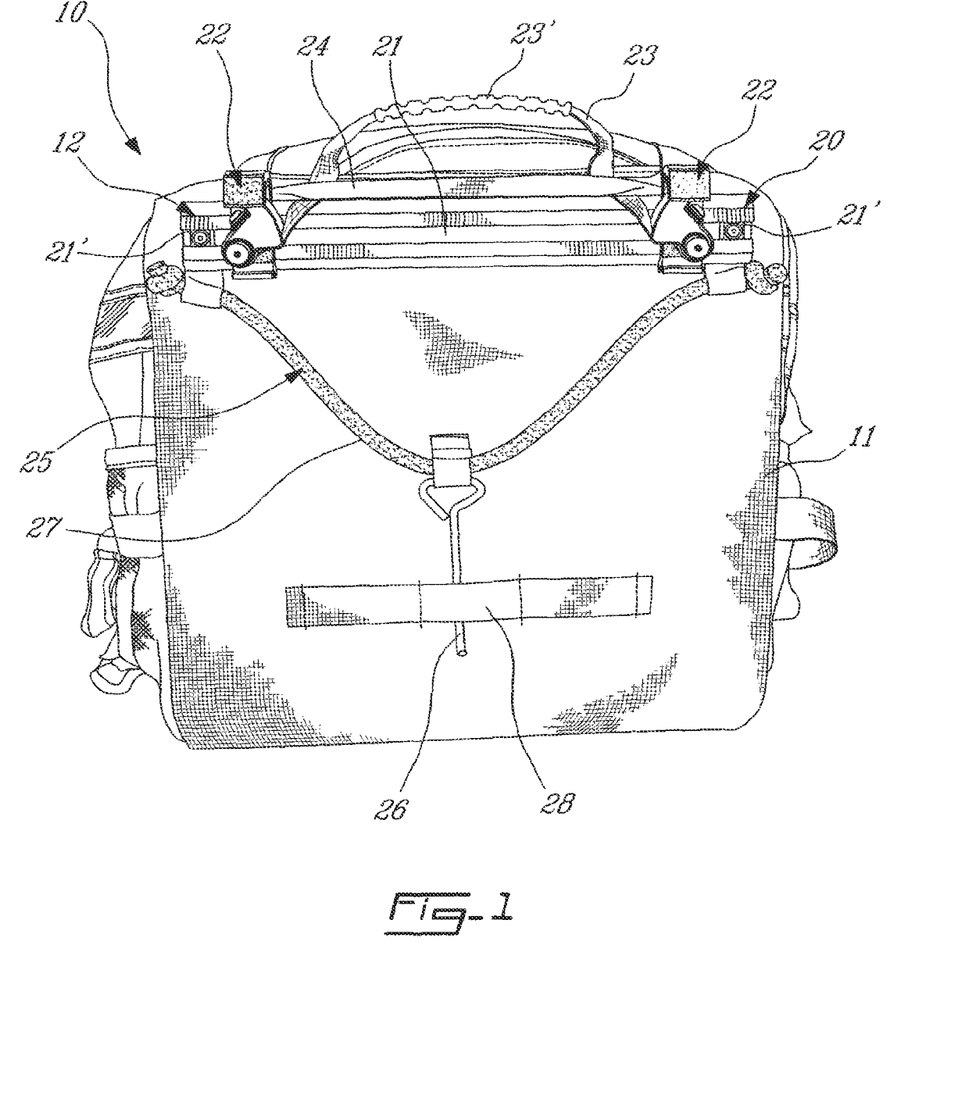
FIG. 1 is a rear perspective view of a pannier having a connection system constructed in accordance with a first embodiment of the present invention.

Referring to the drawings and more particularly to FIG. 1, a pannier in accordance with a first embodiment is generally shown at 10. The pannier 10 has a container portion 11, such as bag as illustrated in FIG. 1, and a connection system 12.

The container portion 11 is provided to accommodate items of any type to be transported by the pannier 10. Although a bag is illustrated as container portion 11, other types of containers may be used in the pannier 10, such as a basket, a rigid container, etc.

The connection system 12 is provided to secure the container portion 11 to a rack, or other vehicle component, such as handlebar, strut, etc. For simplicity purposes, the pannier 10 will be described hereinafter as being connectable to a rod/rod-like member of a bike rack, although it may also be connected to other members of other types of vehicles (e.g., tricycles, motorcycles, etc.)

The connection system 12 optionally has a track 20. The track 20 is the interface between the connection system 12 and the container portion 11. The track 20 defines a channel 21 supporting a pair of connectors 22 such that the connectors 22 are slidingly displaceable along the channel 21. Accordingly, a position of the connectors 22 on the track 20 is adjustable to adapt the connection system 12 to different lengths of rods, or to different rod configurations. For instance, some panniers are mounted on racks having transverse rods, whereby the position of the connectors 22 is adjusted on the pannier 10 to avoid such transverse rods. Stops 21' are provided at opposed ends of the channel 21 to limit movement of the connectors 22 in the channel 21. The connectors 22 will be described in further detail hereinafter.

A carrying strap 23 is connected at opposed ends to the connectors 22, and forms a loop projecting upwardly from a top surface of the container portion 11. In this grasping position, the carrying strap 23 forms a handle by which the pannier 10 is manually carried around. A tube 23' is provided in the loop for additional ergonomy in grasping the strap 23. As an alternative to a single carrying strap 23, it is considered to provide a strap for each connector 22.

A retaining strap 24 extends along the track 20. The retaining strap 24 ensures that the loop of the carrying strap 23 is always in a position for being grasped, as illustrated in FIG. 1. Moreover, the retaining strap 24 generally preserves the position of the ends of the carrying strap 23 as wrapped around the cams 34, which position is required to ensure that the cams 34 are actuated in a single pulling action of the carrying strap 23. The tube 23' helps in ensuring that the loop of the carrying strap 23 remains in position with respect to the retaining strap 24.

Figure 10:
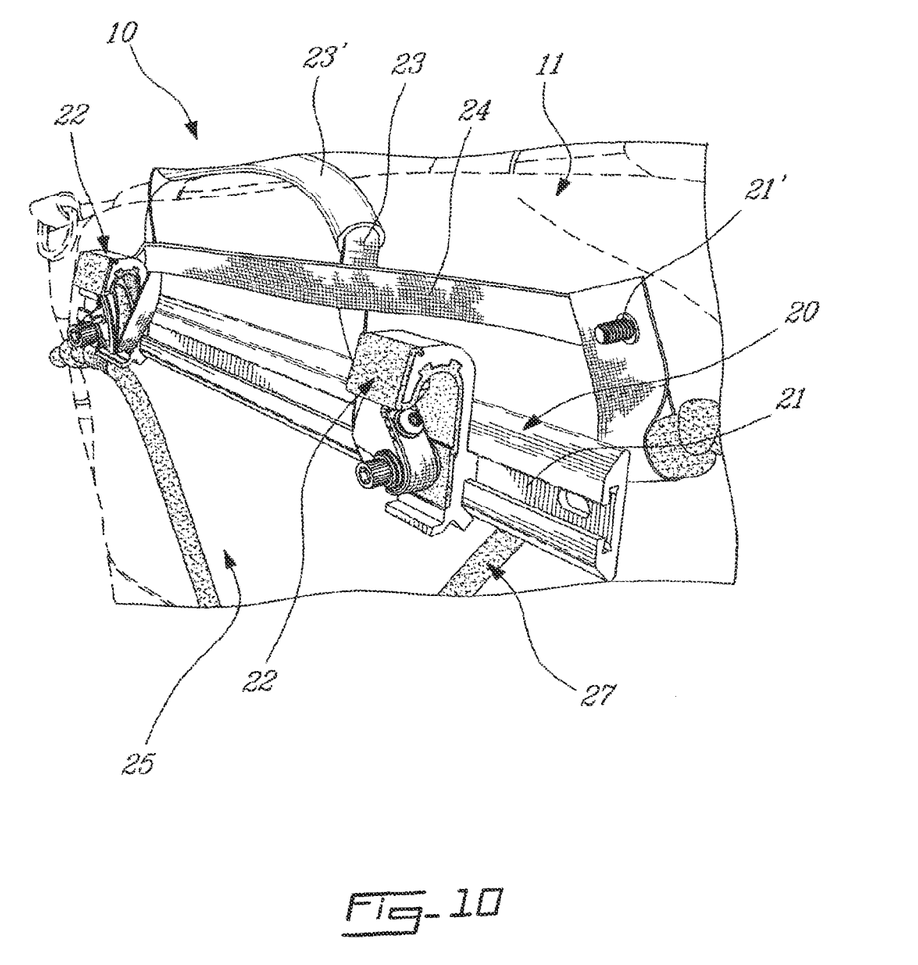
FIG. 10 is an enlarged assembly view of the pannier of FIG. 1, showing a relation between a track and a retaining strap.

Referring to FIG. 10, it is shown that the retaining strap 24 is secured at opposed ends (one of which is shown) to the bolts that are part of the stops 21'. The bolts of the stops 21' are also used to secure the track 20 to the container portion 11.

A stabilizing elastic system 25 is optionally provided on the pannier 10 and has a hook 26 and an elastic 27. The biased hook 26 is maintained against a rear surface of the container portion 11 by way of a strip of material 28. The strip of material 28 presents more than one slot (i.e., three in the illustrated embodiment) in which the hook 26 may be received. The slot is selected as a function of the desired position of the pannier 10 on the rack. A foremost slot is selected to position the pannier 10 as rearwardly as possible, to avoid having the pannier 10 impede the heel of the rider during the pedaling motion. It is contemplated to provide alternatives to the stabilizing elastic system 25. As seen in FIG. 10, the elastic 27 is secured to the bolts of the stops 21' by way of loops of material.

Figure 2:
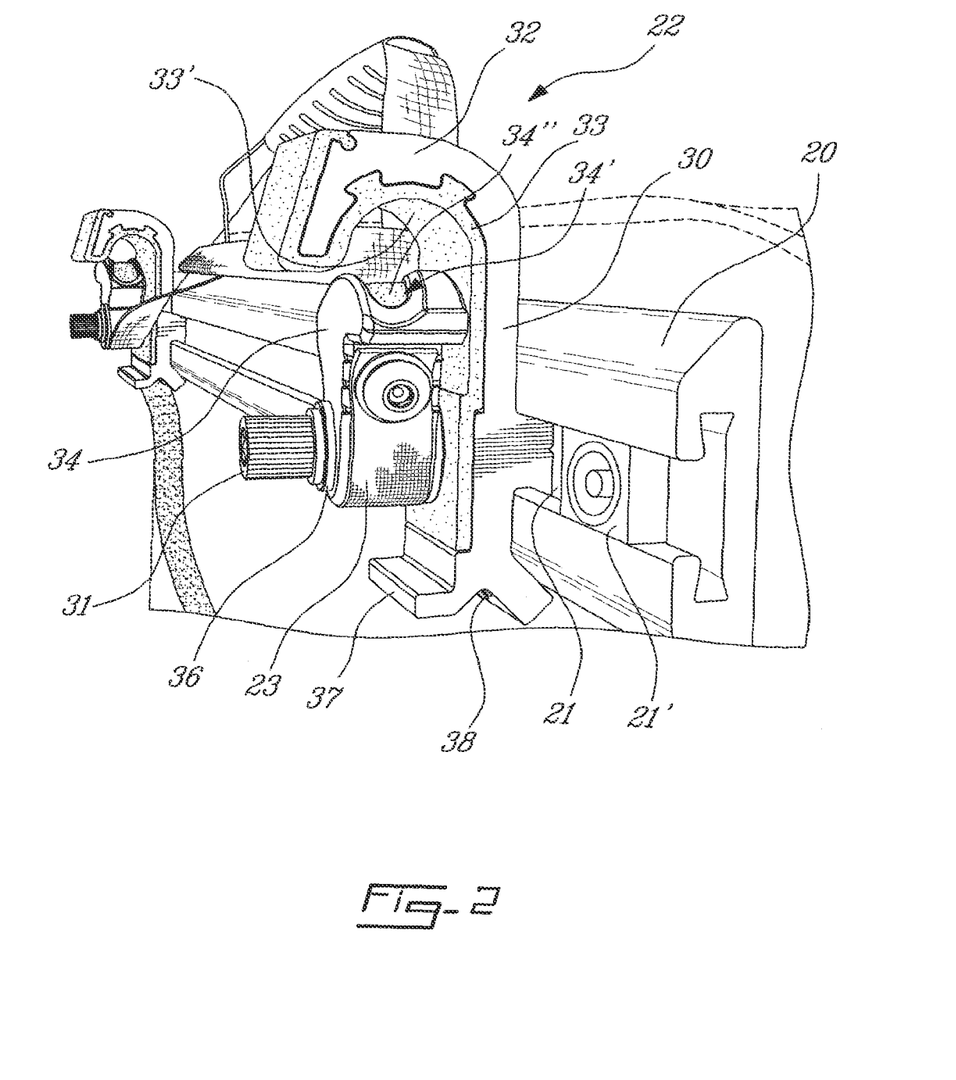
FIG. 2 is an enlarged perspective view of a connector of the pannier of FIG. 1, illustrating a cam in a locking position.

Referring to FIG. 2, each connector 22 has a base member 30 by which the connector 22 is slidingly connected to the track 20. The base member 30 is held captive in the channel 21 of the track 20, thereby forming a translational joint therewith. A fastener 31, illustrated as a bolt in FIGS. 1 and 2, is generally perpendicular to the track 20 and is tightenable using a tool (e.g., screwdriver, Allen key ratchet, etc.) to hold the cam 34 in pivoting engagement onto the base member 30. Although a bolt is illustrated in FIGS. 1 and 2, other fasteners and like devices may be used as alternatives.

Each connector 22 has a hook portion 32. In the first embodiment, the hook portion 32 is integral with the base member 30. An abutment insert 33 covers the hook portion 32. The insert 33 is typically made of a polymeric material to prevent damaging the rack finish (e.g., scratching the paint), and the hook portion 32, as part of the base member 30, is made of a rigid material such as a metal (e.g., aluminum, polymeric material, and the like). The abutment insert 33 is also provided to prevent the premature wear of the hook portion 32. In the first embodiment, the abutment insert 33 is slidingly engaged into the concavity of the hook portion 32, and defines a contact surface 33' of generally arcuate cross-section. Other configurations are considered for the hook portion 32, such as having a polymeric material molded onto a metallic base, or one integral member made of a polymeric material combining the abutment insert 33, the hook portion 32 and the base member 30.

Figure 3:
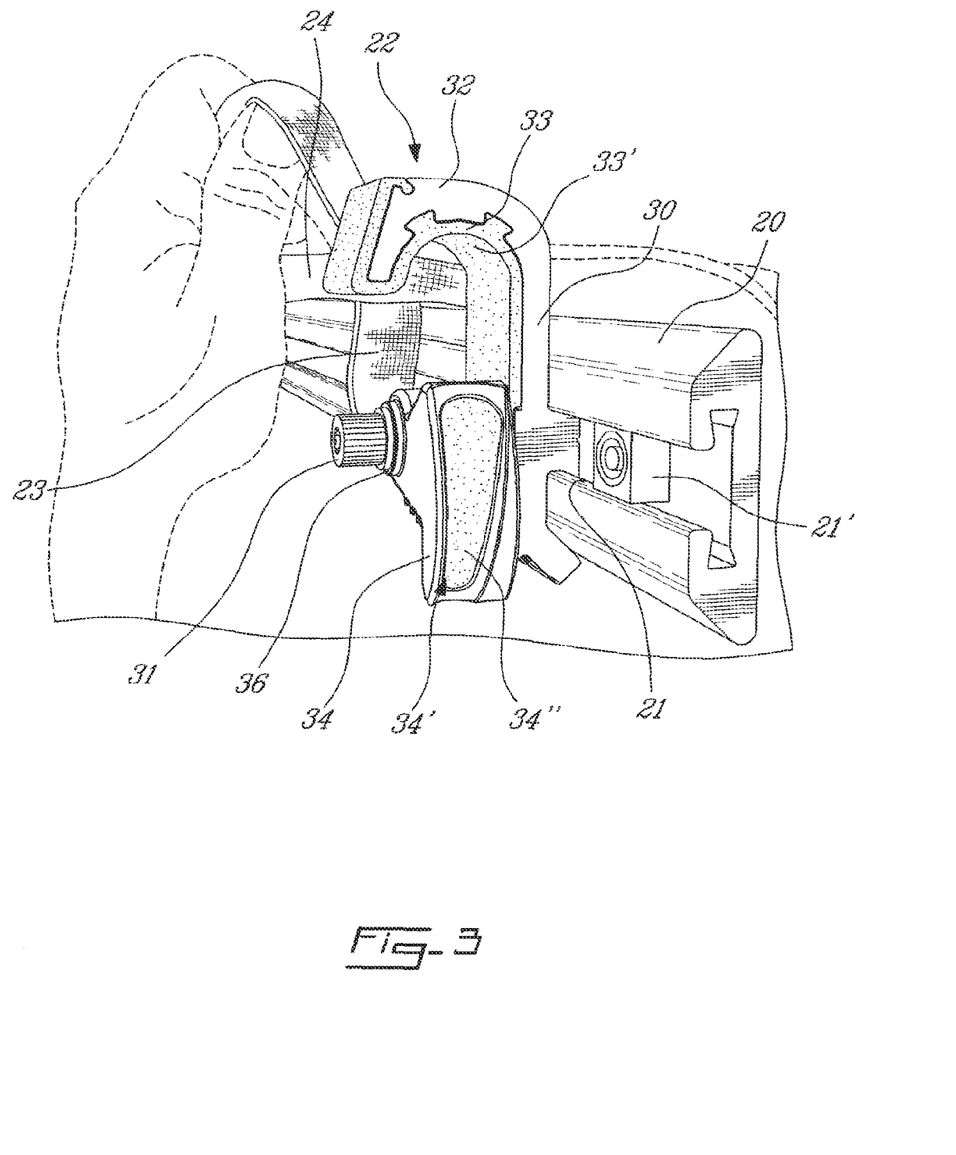
FIG. 3 is a perspective view of the connector of FIG. 2, with the cam in an opened position.

In each of the connectors 22, a cam 34 is pivotally mounted to the base member 30. In the first embodiment, the fastener 31 serves as pivot for the cam 34. The cam 34 has a contact surface 34' as best seen in FIG. 3. The contact surface 34' may be generally smooth, but it is contemplated to provide a concavity in the contact surface 34'. In such a case, the surface of contact between the cam 34 and the rod is increased, whereby the friction therebetween is enhanced to limit movement of the connectors 22 along or about a rod. The cam 34 is made of a rigid material, such as polymeric material (e.g., having a relatively high friction coefficient in a material similar to that of the insert 33) or a metal such as aluminum. As illustrated in FIG. 3, it is considered to provide a shim 34" in the concavity of the contact surface 34'. The shim 34" is used to increase a friction coefficient between the rod-like member A (FIG. 9) and the cam 34.

Accordingly, the material used for the shim 34" is selected amongst materials having relatively high friction of coefficient, such as a rubber (e.g., a thermoplastic polyurethane elastomer or the like). Moreover, the concavity of the contact surface 34' defines a pair of abutment walls on both sides of the shim 34", creating structural members reducing the risk of unhooking of the rod-like member A from the hook portion 32/cam 34. The radius of curvature of the concavity is optionally selected as a function of the diameter of the rod-like member A, with a smaller diameter of the concavity selected for smaller rod-like members, for the concavity to encapsulate the rod-like member. It is considered as an option to align the shim 34" along the abutment wall of the cam 34 that is adjacent to a free end of the hook portion 32, as the rod-like member has a tendency in some instances to lean against this free end of the hook portion 32.

Figure 4:
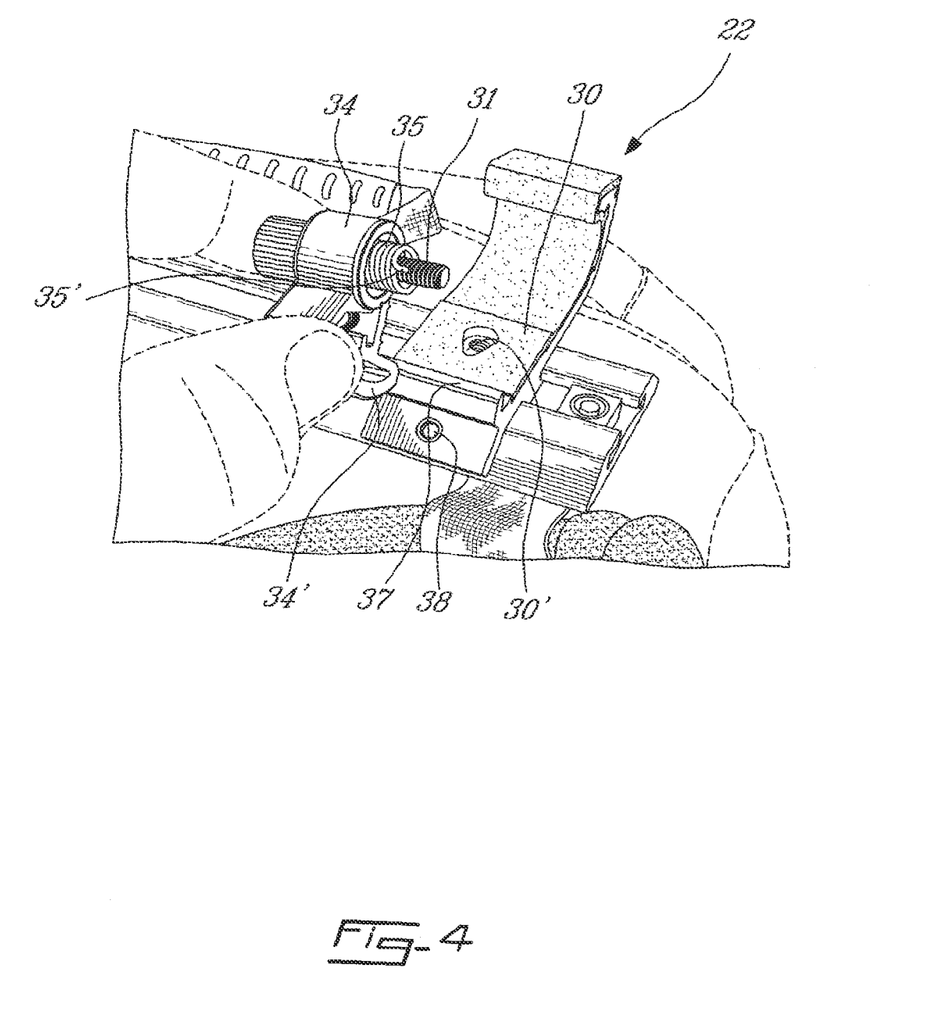
FIG. 4 is an assembly view of one of the connectors of the pannier of FIG. 1.

The cam 34 is displaceable between a locking position as illustrated in FIG. 2, and an opened position, as illustrated in FIG. 3. The cam 34 is biased toward the locking position so as to lock a rod therein. In the first embodiment, in order to be biased, the cam 34 houses a biasing member 35 as shown in FIG. 4. The biasing member 35 is illustrated as being a torsion spring having projecting ends 35', only one of which is visible in FIG. 4. One of the projecting ends 35' is received in an extension 30' of the fastener hole of the insert 33, which fastener hole is provided for the fastener 31. The other end 35' is accommodated in a bore (not shown) in the cam 34.

Figure 5:
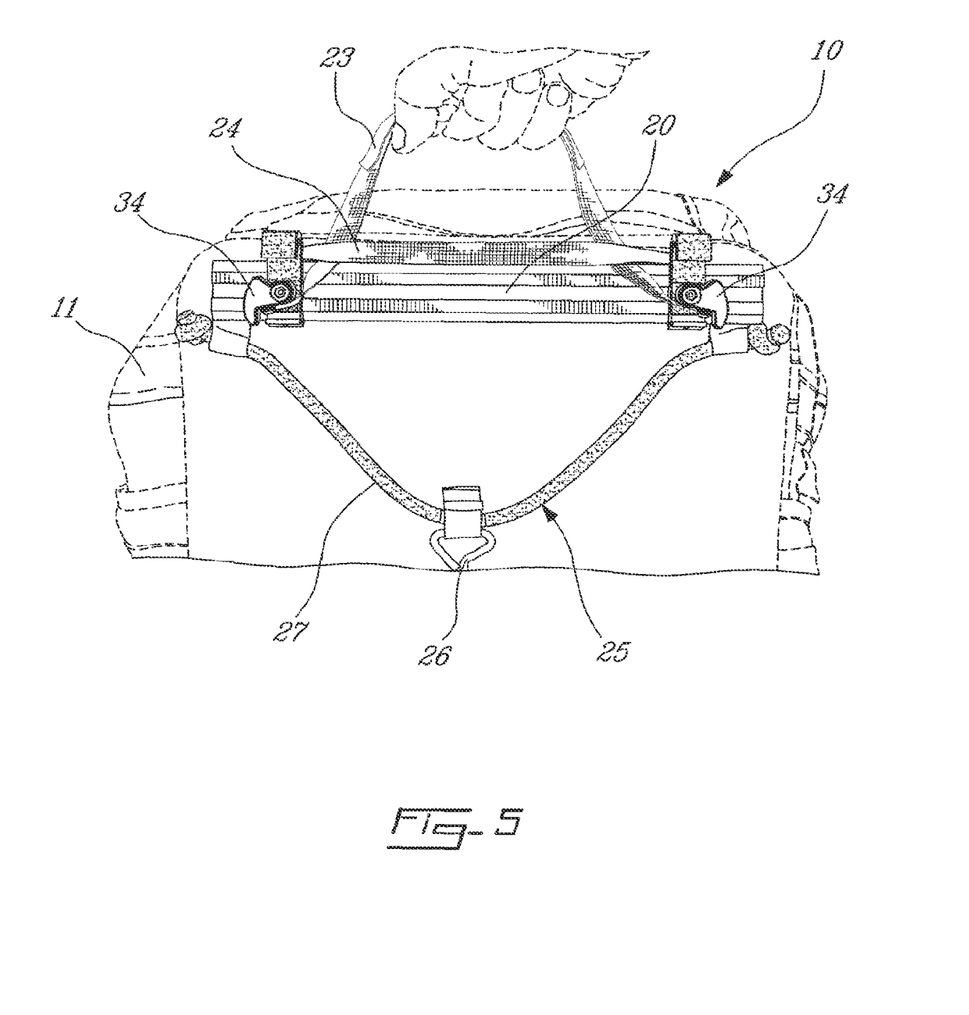
FIG. 5 is a rear perspective view of the pannier of FIG. 1, with a carrying strap subjected to a manual pulling action.

It is pointed out that washers 36 are optionally provided to limit the amount of play between the fasteners 31 and the cams 34. The fasteners 31 and the cams 34 are sized such that the locking of the fasteners 31 does not impede the rotation of the cams 34. Accordingly, in instances there might be some play between the head of the fasteners 31 and the cams 34, whereby the washers 36 reduce the play. Referring to FIGS. 2 and 3, the cams 34, which are mirror images of one another, are shown being connected to opposed ends of the carrying strap 23. In the first embodiment, the strap 23 is bolted to the cams 34, but other ways of securing the ends of the strap 23 to the cams 34 are also considered (e.g., self-tapping screws, rivets and the like). The carrying strap 23 is connected to the cams 34 in such a way that a pulling action of sufficient magnitude on the strap 23 will move the cams 34 against the action of the biasing member 35 to reach the opened position of FIG. 3. Moreover, as illustrated in FIG. 5, a single pulling action on the carrying strap 23 will cause both cams 34 to reach the opened position.

Figure 6:
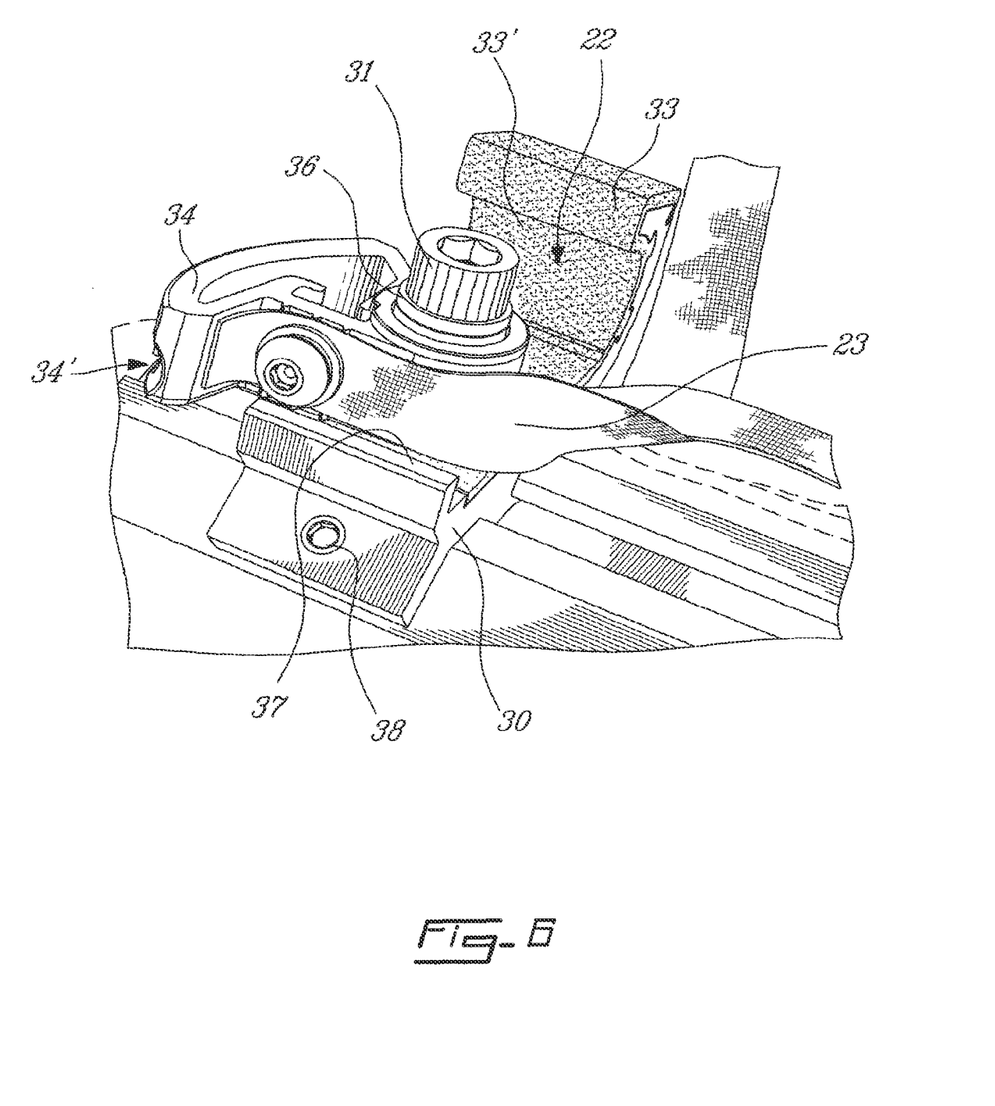
FIG. 6 is an enlarged perspective view of the connector of FIG. 4, with the cam abutted in the opened position.

Referring to FIG. 6, it is shown that an abutment 37 of the base member 30 limits the displacement of the cams 34 to the opened position upon the pulling action on the carrying strap 23.

In order to lock the connectors 22 on the track 20 in a given position, a set screw 38 or like locking mechanism is provided in the base member 30 as is shown in FIG. 6. The set screw 38 is simply screwed whereby a portion of the screw 38 will press against the track 20 to block the translational movement between the connector 22 and the track 20. As an alternative, it is considered to use the fasteners 31 (FIG. 2) to lock the connectors 22 to the track 20, by having the fasteners 31 extend through the base member 30 of the connectors 22.

Figure 7:
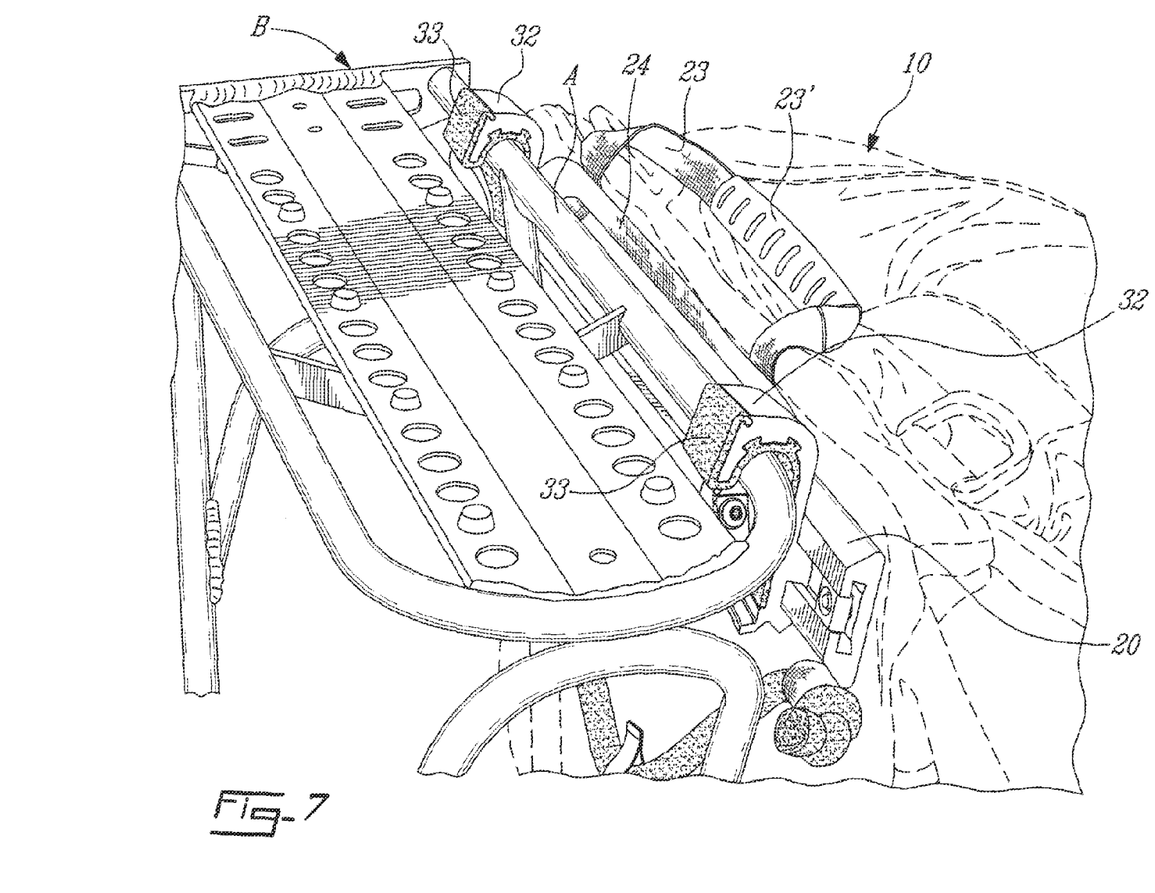
FIG. 7 is an enlarged perspective view of the pannier of FIG. 1, as mounted on a bike rack.
Figure 8:
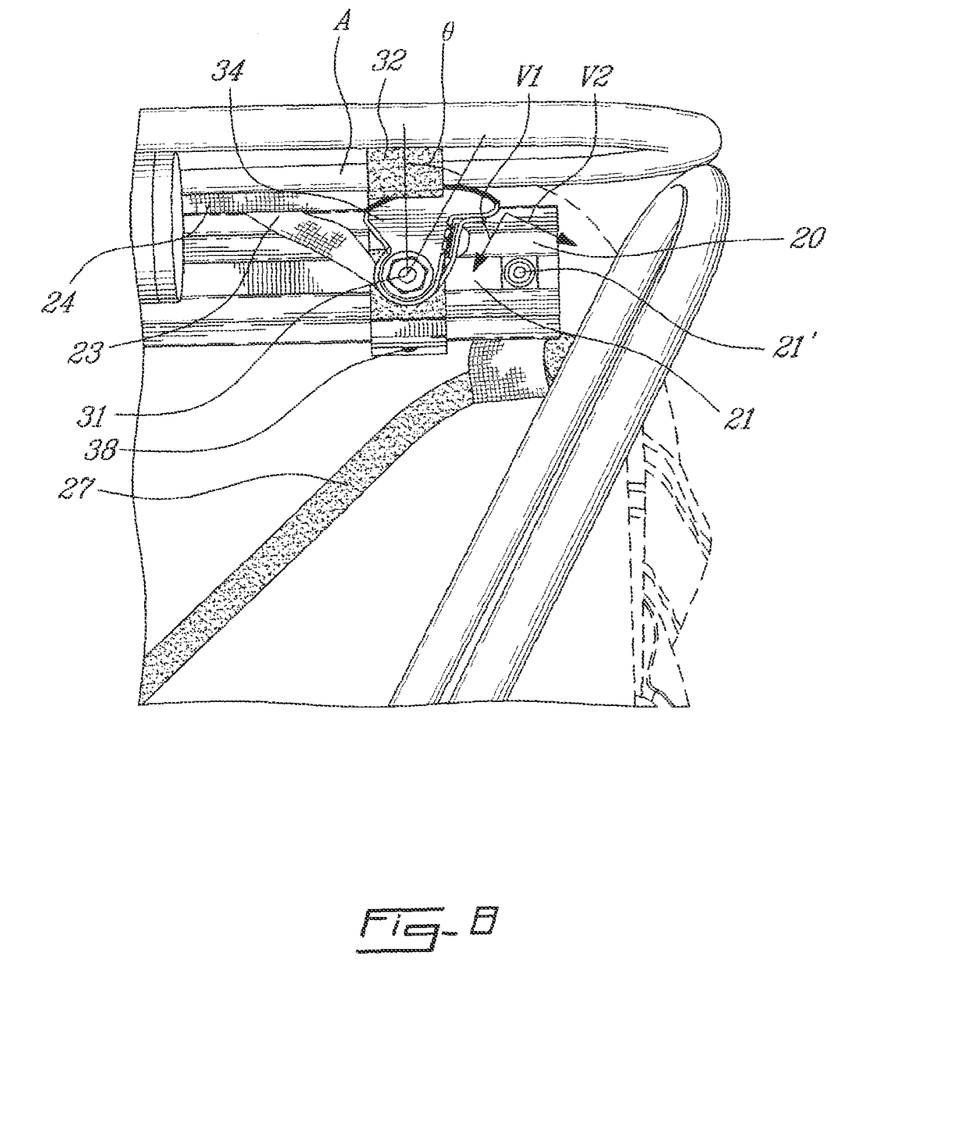
FIG. 8 is an enlarged perspective view of the pannier and bike rack of FIG. 7, showing the cam against a rod of the rack.

When the cams 34 are in the opened position, the pannier 10 may be mounted to a bike rack. Referring concurrently to FIGS. 7 and 8, the pannier 10 is shown mounted in a secured manner to a rod-like member A of a bike rack B. It is shown that the hook portion 32 of the connectors 22 are hooked on the rod-like member. As seen in FIG. 7, the inserts 33 marry the shape of an upper portion of the rod-like member A, and thereby prevent lateral movement between the rod-like member A and the connectors 22. When the hook portions 32 are engaged onto the rod-like member A, the carrying strap 23 is released, causing the cams 34 to contact the rod-like member A.

Referring to FIG. 8, one of the cams 34 is shown having returned to the locking position to lock the pannier 10 to the rod-like member A. It is observed that the cam 34 is biased into contact against the rod-like member A. Therefore, the connectors 22 effectively lock the rod-like member A by the cams 34 being biased directly against the rod-like member A. In one embodiment illustrated by FIG. 8, it is seen that an imaginary line between a pivot center (i.e., center of the fastener 31), and the contact surface or point between the cam 34 and the rod-like member A is close to being vertical, but remains slightly angled, as illustrated by angle .theta. In an embodiment, the angle .theta. ranges between >0 and 20 degrees.

At this orientation of the cams 34 locking the pannier 10 to the rack B, a major portion of the downward vertical force of the rod-like member A against the cams 34 (e.g., when the vehicle is on bumpy roads) is along a radial vector V1, whereas a minor portion of the force is along a tangential vector V2 which is opposed by the force of biasing member 35 and by friction between the rod-like member A and both the insert 33 and the cam 34. This results in substantial structural interference reducing/preventing vertical movement between the connectors 22 and the rod-like member A. Against the force of vector V2, the connection system 12 opposes the biasing action of the biasing member 35 (FIG. 4), as well as friction between the rod-like member A and the connectors 22.

It is considered to have the imaginary line reaching the vertical. This results in a greater amount of force being required to move the cams 34 to their opened position when pulling on the carrying strap 23, as the friction at the position is at its greatest level. However, it is desired to limit the amount of force required to open up the cams 34, whereby it is preferred to keep the angle .theta. between >0 and 20 degrees, as discussed previously.

When the vehicle comes to a stop or accelerates, inertial forces may result in the pannier 10 moving forward or backward along the rod-like member A. In the embodiments of FIGS. 1 to 10, it is seen that the pair of connectors 22 are mirror images of one another. Accordingly, a longitudinal translation of the pannier 10 along the rod-like member A will cause a longitudinal frictional force on the connectors 22 (i.e., along the rod-like member). As the cams 34 are mirror images of one another, one of the cams 34 will have its biasing member 35 (FIG. 4) urging it in the direction of the longitudinal force (i.e., reducing the angle .theta. toward 0 degrees). As such, the friction force of that connector 22 on the rod-like member A increases as angle .theta. nears 0 degrees, resulting in greater opposition to the translation of the pannier 10 along the rod-like member A.

The materials used for the connector 22 are typically selected as a function of their respective coefficients of friction. The coefficients of friction of the materials, the force of the biasing members 35 and the angle .theta. are selected so as to minimize rattling between the pannier 10 and the rod-like member A, while also minimizing the effort required in the pulling action on the carrying strap 23 to open the connectors 22.

In bike racks such as bike rack B, the rod-like member diameters are within a given range, namely between 7 and 15 mm. Accordingly, a radius of 7.5 mm for the contact surface 33' of the inserts 33 is well suited to accommodate the rod-like members having diameters within standard ranges. This range of rod diameters is considered when positioning the cam 34 with respect to the hook portion 32, so as to have angle .theta. at a desired value (e.g., about 15 degrees).

Figure 9:
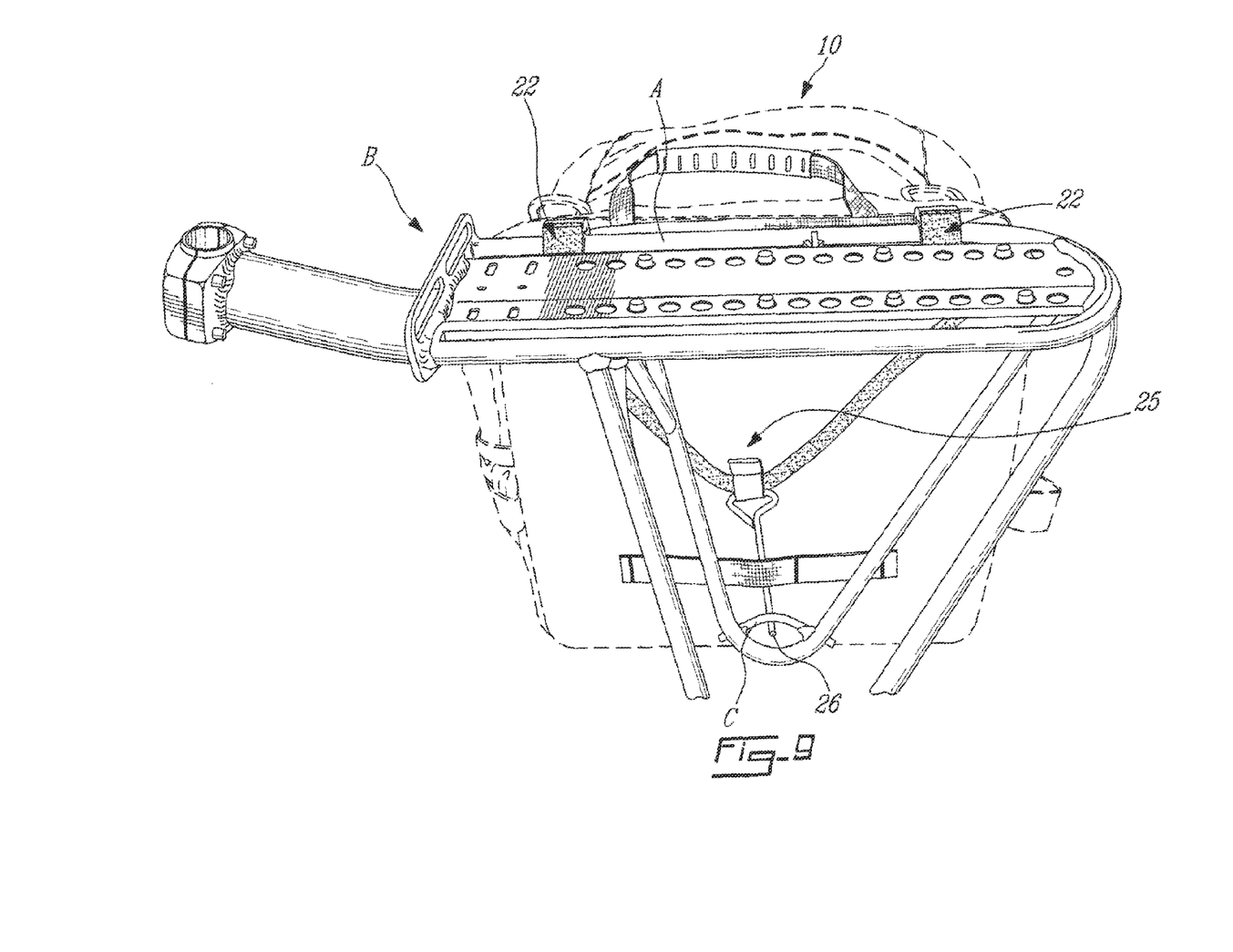
FIG. 9 is an enlarged perspective view of the pannier and bike rack of FIG. 7, showing the stabilizing elastic system cooperating with the bike rack.

Referring to FIG. 9, the stabilizing elastic system 25 is shown cooperating with the bike rack B to limit movement of the pannier 10 with respect to the bike rack B. More specifically, the hook 26 is hooked on a loop C in the bike rack B or on another part of the vehicle (e.g. axle bolt fitting), thereby opposing a force against rotation of the pannier 10 about the rod-like member A. Moreover, the stabilizing elastic system 25 opposes a force against translation of the pannier 10 along the rod-like member A. Therefore, for the pannier 10 illustrated in FIG. 1, the hook 26 is pulled into engagement with the loop C, prior to the pannier 10 being mounted on the rod-like member A. The carrying strap 23 is then pulled upward, and the combination of gravity and, if applicable, the tension in the elastic 27 will cause the cams 34 to reach their opened position such that the hook portions 32 accommodate the rod-like member A. The carrying strap 23 is then released to have the cams 34 lock the connectors 22.

To remove the pannier 10 from the bike rack B, the carrying strap 23 is pulled upwardly, whereby the cams 34 reach their opened position (FIG. 3). The pannier 10 is then slightly pulled up vertically and laterally away from the rod-like member A. If the pannier 10 has a stabilizing elastic system 25, the hook 26 is then released from the loop C, by lowering the pannier 10.

It is considered to have a single one of the connectors 22 on the pannier 10. Such a configuration is used with smaller panniers 10, and is typically combined with a hook portion 32 of greater width for stability of the pannier on the bike rack. Likewise, for larger panniers a plurality of the connectors 22 may be used.

In the first embodiment, the pivot axis of the cams 34 is generally normal to a plane in which both the cams 34 and the rod-like member A lie. It is also considered to have the pivot axis parallel to this plane, or in other suitable orientations, but is generally preferred that the pivot axis of the cams 34 be generally transverse an axis of the rod-like member A, from a top plan view.

In one embodiment, the connection system 12, including the retaining strap 24, is connected to the container portion 11 by way of the bolts of the stops 21', as are previous connection systems. Therefore, the connection system 12 is retrofittable on some existing panniers.

The invention claimed is:

1. A pannier comprising:
   a container portion adapted to accommodate items;
   a connection system connected to the container portion and comprising two connectors for connection to a rod-like member, each of the two connectors having a portion rotatable between an opened position to allow the connectors to be installed onto the rod-like member, and a locking position in which the portions lock the connectors to the rod-like member, and a biasing member biasing the portions toward the locking position, wherein:
   said portions each have at least one concave abutment surface configured to abut against the rod-like member in the locking position;
   said portions of the connectors each rotate about an axis transverse with respect to the rod-like member; and
   said portions of the connectors are oriented so as to rotate in opposite directions with respect to one another when concurrently rotating to the opened position and concurrently rotating to the locking position;
   a strap connected to said portions of both of the connectors, the strap being positioned with respect to the container portion in a grasping position such that a pulling action on the strap concurrently rotates said portions to the opened position.

2. The pannier according to claim 1, wherein the connection system has a track secured to the container portion, the two connectors being slidingly mounted to the track such that a position of the two connectors on the track is adjustable as a function of a shape of the rod-like member.

3. The pannier according to claim 2, wherein each of the connectors has a locking mechanism to lock the connectors on the track in selected positions.

4. The pannier according to claim 2, further comprising a retaining member connected to at least one of the connection system and the container portion, and arranged so as to maintain the strap in the grasping position.

5. The pannier according to claim 4, wherein the track is secured to the container portion by a pair of fasteners at opposed ends of the track, with the retaining member being connected at opposed ends to the fasteners between the track and the container portion.

6. The pannier according to claim 5, wherein the fasteners are positioned with respect to the track so as to limit the translation of the connectors along the track.

7. The pannier according to claim 1, further comprising a grasping tube on the strap.

8. The pannier according to claim 1, further comprising an elastic connected at opposed ends to the connection system, and a hook on the elastic, the hook being connected to a structure associated with the rod-like member to stabilize the pannier on the structure.

9. The pannier according to claim 1, further comprising a retaining member connected to at least one of the connection system and the container portion, and arranged so as to maintain the strap in the grasping position.

10. The pannier according to claim 1, wherein the concave abutment surface is made of a plastic.

11. The pannier according to claim 1, wherein the concave abutment surface is made of a thermoplastic.

* * * * *